United States Patent
Kidono et al.

(10) Patent No.: US 7,167,204 B2
(45) Date of Patent: Jan. 23, 2007

(54) AUTOMATIC EXPOSURE CONTROL APPARATUS AND METHOD

(75) Inventors: Masami Kidono, Tachikawa (JP); Hitoshi Hashimoto, Sagamihara (JP); Dai Kawase, Hino (JP)

(73) Assignee: Olympus Corporation, Tokyo (JP)

( * ) Notice: Subject to any disclaimer, the term of this patent is extended or adjusted under 35 U.S.C. 154(b) by 637 days.

(21) Appl. No.: 10/205,433

(22) Filed: Jul. 25, 2002

(65) Prior Publication Data

US 2002/0180874 A1 Dec. 5, 2002

Related U.S. Application Data

(62) Division of application No. 09/165,414, filed on Oct. 2, 1998, now Pat. No. 6,618,090.

(30) Foreign Application Priority Data

Oct. 3, 1997 (JP) ................................. 9-271578

(51) Int. Cl.
*H04N 5/235* (2006.01)
*H04N 5/217* (2006.01)
*H04N 9/64* (2006.01)

(52) U.S. Cl. ...................... 348/364; 348/362; 348/248; 348/241

(58) Field of Classification Search ................ 348/241, 348/248, 296, 362, 364
See application file for complete search history.

(56) References Cited

U.S. PATENT DOCUMENTS

| | | | |
|---|---|---|---|
| 3,950,765 A * | 4/1976 | Nanba et al. ............... 396/245 |
| 4,345,825 A | 8/1982 | Matteson et al. |
| 4,381,889 A * | 5/1983 | Sahara et al. ............... 396/258 |
| 4,581,651 A * | 4/1986 | Miyata et al. ............... 348/249 |
| 5,282,041 A | 1/1994 | Tani et al. |
| 5,293,239 A * | 3/1994 | Takahashi et al. .......... 348/241 |
| 5,608,455 A | 3/1997 | Oda |
| 5,734,426 A | 3/1998 | Dong |
| 5,812,703 A | 9/1998 | Juen et al. |
| 5,926,214 A | 7/1999 | Denyer et al. |
| 6,480,226 B1 * | 11/2002 | Takahashi et al. .......... 348/296 |
| 6,587,149 B1 * | 7/2003 | Yoneyama et al. ......... 348/362 |
| 6,618,090 B1 * | 9/2003 | Kidono et al. .............. 348/362 |

FOREIGN PATENT DOCUMENTS

JP 57335 1/1993

* cited by examiner

*Primary Examiner*—Lin Ye
(74) *Attorney, Agent, or Firm*—Volpe and Koenig, PC

(57) ABSTRACT

An automatic exposure ("AE"), control apparatus to prevent exposure errors resulting from "smear." Image-capturing is performed at a single exposure time TI (I=1, 2, . . . n); a CCD output is applied with a CCD drive signal to perform an integrating operation for a signal in an AE area using an integration circuit, and then outputs integration value EI+SI at each exposure time. A shutter trigger operation presents readout of an exposure value. An integrator value En+Sn obtained just before the shutter trigger operation, and a smear value Sn' obtained just after the shutter trigger operation are provided to an exposure operation/control circuit. The exposure operation/control circuit then performs an AE operation to receive En+Sn−Sn≈En and compares the value to a target value for determining exposure conditions, and provides an AE operation value containing almost no smear component to determine an appropriate exposure condition.

23 Claims, 5 Drawing Sheets

AUTOMATIC EXPOSURE CONTROL APPARATUS AND METHOD

CROSS REFERENCE TO RELATED APPLICATION

This application is a divisional of U.S. application Ser. No. 09/165,414, filed Oct. 2, 1998, now U.S. Pat. No. 6,618,090 which is hereby incorporated by reference in its entirety.

BACKGROUND OF THE INVENTION

1. Technical Field of the Invention

The present invention relates to an automatic exposure control apparatus that automatically controls exposure by utilizing an output signal of a solid-state imaging device.

2. Description of the Related Art

Recently, there has been increasing use of electronic image-capture apparatuses that use an imager, which employs a solid-state imaging device to capture subject images, and that record the captured images in a storage medium of semiconductor memory or magnetic tape.

To automatically set an image-capture optical system in an image-capture apparatus such as that described above under appropriate exposure conditions, an automatic exposure control apparatus is employed.

As a type of automatic exposure control apparatus, there is an apparatus that makes use of an output from a charge-coupled device (hereinafter referred to as a "CCD") to perform automatic exposure control (a so-called "imager AE"); more particularly, there is an apparatus that integrates an automatic exposure sensing area of an image output from a CCD and refers to the integration result to determine exposure conditions (such as shutter speed and diaphragm aperture adjustment).

FIG. 5 is a timing chart illustrating an example of an automatic exposure control operation of a conventional automatic exposure control apparatus. In this figure, each of the horizontal axes represents time and is separated into two sections because of limited space, the right end of the axis in the upper section continuing to the left end of the axis that has the same alphabetical letter (i) (i=a, b, . . . , f) in the respective lower section. Other figures such as FIG. 2 are displayed in the same way.

In FIGS. 5,(a)–(f) respectively represent a mecha-shutter, CCD readout pulse ON/OFF (ON permits a readout-pulse output; OFF inhibits a readout-pulse output), exposure time, CCD output, AE area integration, and AE operation.

The mecha-shutter is kept in an OPEN state until it receives a shutter trigger, but it changes to a CLOSE state upon receipt of a shutter trigger.

Regarding the CCD readout pulse, it is transferred from a photosensitive area (photoelectric conversion area) of the CCD, and it is always kept in an ON state.

After an exposure time TI, a signal charge of the CCD photoelectric conversion area is then transferred to a transfer area as a CCD readout pulse, the transferred signal charge has vertical and horizontal transfer pulses applied to it, and then it is output from the CCD.

The CCD output signal which corresponds to an AE sensing area is subjected to an integrating operation. This is indicated as the integration value EI+SI as an AE area integral. Here, EI represents an integration value of net signal charge accumulated in the CCD photoelectric conversion area (the AE sensing area of) at the exposure period TI; SI represents an integration value of a so-called smear occurring in a vertical transfer area because of oblique incidence transmission of a bright subject image and the like.

An operation area for performing an automatic exposure operation performs an AE operation to compare the integration value EI+SI to a target value. If EI+SI>target value, the operation area then determines the next exposure time TI+1 so as to be TI>TI+1; while, if EI+SI<target value, it then determines the next exposure time TI+1 so as to be TI<TI+1.

In this way, the next exposure time is consecutively determined, and if a release operation is performed after an exposure time Tn and a shutter trigger are received, the exposure time required for actual image-recording is then determined from the integration value En+Sn; and after the exposure time is determined, it is further transferred as a CCD readout pulse to a transfer area, the mecha-shutter is shut off, and then a CCD output is produced through application of the vertical and horizontal transfer signals.

In this state, the mecha-shutter is kept shut; therefore, the smear integration value is zero (0). This is different from the condition in which the AE operation is performed by determining exposure time by keeping the mecha-shutter open.

Particularly, before performing exposure, the next exposure time has previously been determined when there has always been a smear component present existed; however, at the time of actual exposure, the exposure amount is reduced by the amount corresponding to the smear component when it is not present. This indicates that the exposure amount at an actual exposure time is set as En/(En+Sn), which is reduced to correspond to the smear component ratio.

For this reason, defects have occurred in that the larger the smear effect, the darker the captured image has been.

With the conventional example, in a bright scene in which the smear occurs and at the imager AE, the required exposure time has been determined on the basis of CCD output in consideration of smear inclusion, so that when images are captured by use of a camera allowing use of a mecha-shutter or diaphragm thereof to reduce the aperture, defective captured images being dark in proportion to the smear amount are produced.

SUMMARY OF THE PRESENT INVENTION

In consideration of the aspects described above, the present invention has been made to provide an automatic exposure control apparatus which can prevent exposure errors resulting from smears when determining exposure conditions of digital cameras and the like to record images of bright scenes in which smears occur.

A first automatic exposure control apparatus according to the present invention receives an exposure evaluation value from an output signal of a solid-state imaging device and uses the evaluation value as a reference value to perform automatic exposure control for the solid-state imaging device; in which by receiving an exposure evaluation value containing almost no smear component from two output signals received through application of the same drive signal from the solid-state imaging device that has image-captured in a first exposure time and in an exposure time which is practically twice that of the first exposure time, automatic exposure control with almost no smear-component effect can be performed. In addition, images can be recorded in an appropriate exposure condition with almost no exposure error resulting from the smear component even in bright scenes at the actual exposure time.

A second automatic exposure control apparatus according to the present invention which receives an exposure evaluation value from an output signal of a photoelectric conversion area performing photoelectric conversion and an output signal of a solid-state imaging device comprising a transfer area in which the signal is transferred from the photoelectric conversion area and uses the evaluation value as a reference value to perform automatic exposure control for the solid-state imaging device comprises: a first drive means to transfer a signal in a photoelectric conversion area in each exposure period to a transfer area and then to output the signal from a solid-state imaging device; and a second drive means to output a signal in a photoelectric conversion area from a solid-state imaging device, while not transferring the signal to a transfer area; in which by receiving an exposure evaluation value containing almost no smear component from two output signals received from the first drive means and the second drive means, it is possible to automatically determine exposure with almost no-smear-component effect even in bright scenes in which smears occur.

A third automatic exposure control apparatus according to the present invention which receives an exposure evaluation value from an output signal of a photoelectric conversion area performing photoelectric conversion and an output signal of a solid-state imaging device comprising a transfer area into which the signal is transferred from the photoelectric conversion area and uses the evaluation value as a reference value to perform automatic exposure control for the solid-state imaging device comprises: a first drive mode to transfer, before a release operation, a signal in a photoelectric conversion area in each exposure period to a transfer area and then to output the signal from a solid-state imaging device; and a second drive mode for outputting, after a release operation, a signal in a photoelectric conversion area from a solid-state imaging device without transferring the signal to a transfer area; in which by receiving an exposure evaluation value containing almost no smear component from an output signal received in the second drive mode and an output signal received in the first drive mode just before the second drive mode signal, an exposure evaluation value containing almost no smear component can be received after the release operation; thereby allowing recording of image subjects at appropriate exposure with almost no smear-component effect even in bright scenes in which smears occur.

DETAILED DESCRIPTION OF THE EMBODIMENTS

Figure 1:
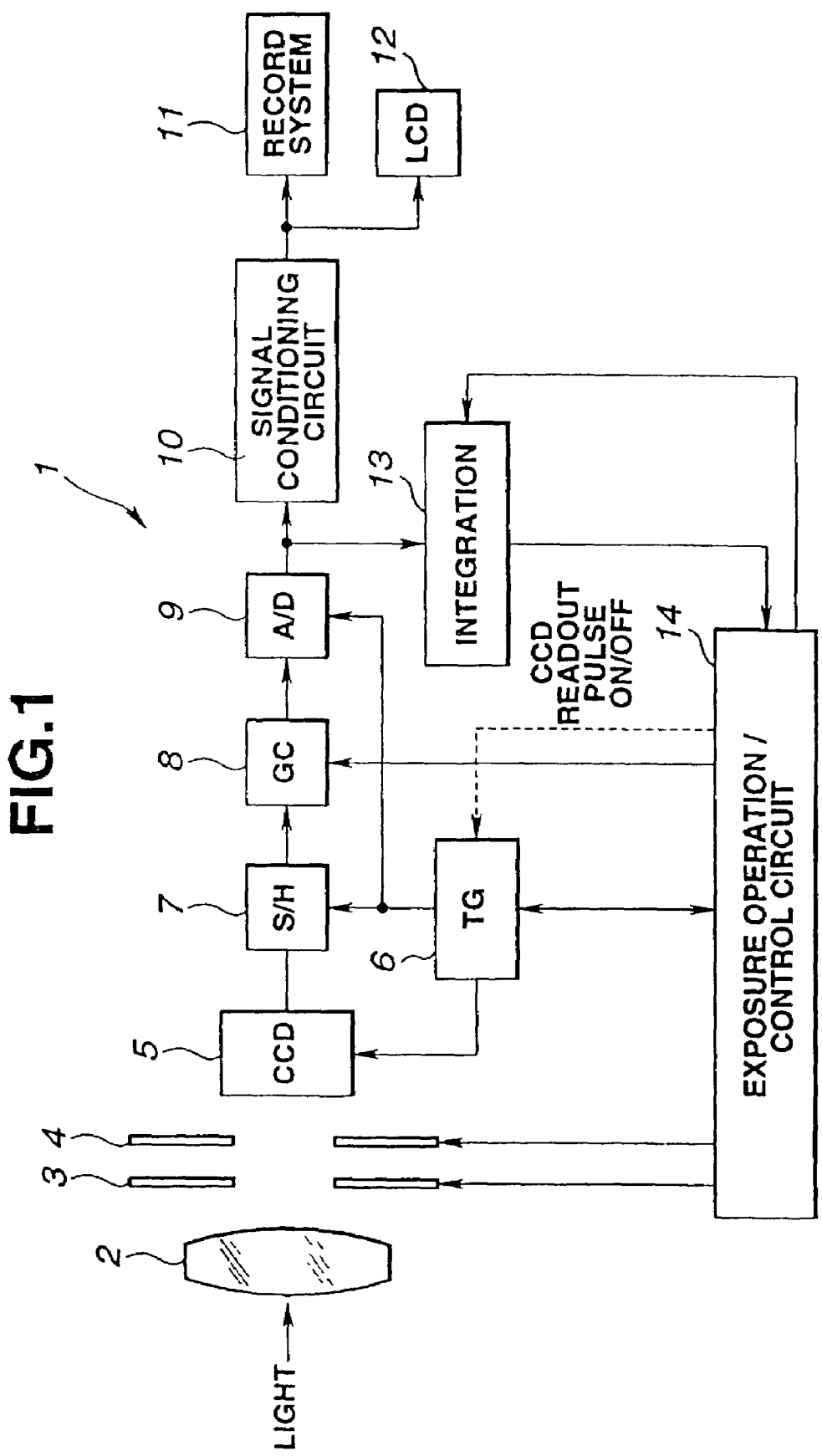
FIG. 1 is a block diagram showing a general construction of a digital still camera comprising an automatic exposure control apparatus of a first embodiment of the present invention.

Referring to the drawings, embodiments of the present invention are described below.

Figure 2:
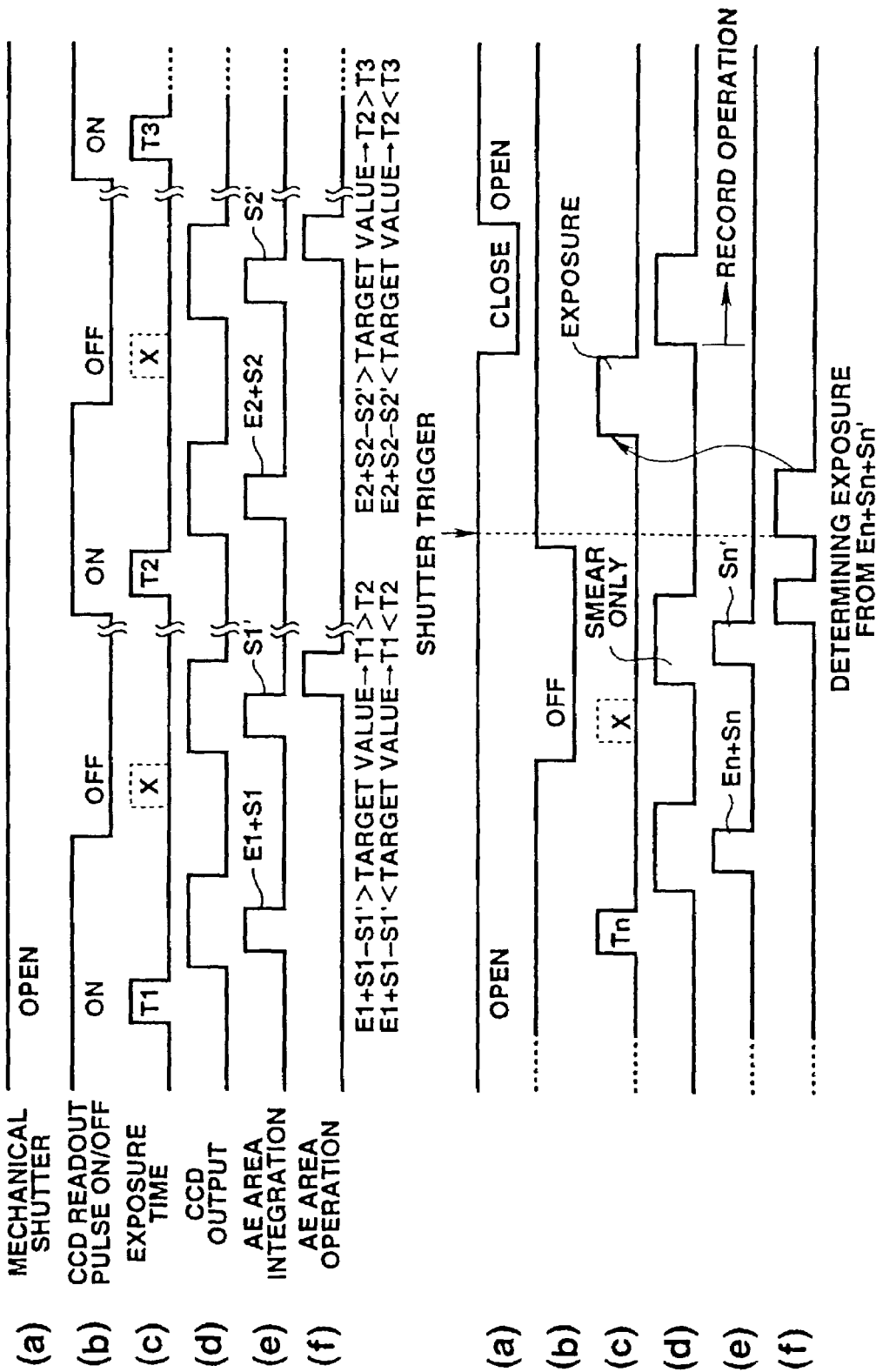
FIG. 2 is a timing chart for a description of operation of the first embodiment of the present invention.

FIGS. 1 and 2 are relevant to a first embodiment of the present invention; FIG. 1 is a block diagram showing a general construction of a digital still camera comprising an automatic exposure control apparatus of a first embodiment of the present invention; and FIG. 2 is a timing chart for a description of operation of the first embodiment of the present invention.

As shown in FIG. 1, in a digital still camera 1 for use in the first embodiment, light from an image subject enters a CCD 5, an imager, through an image-capture lens 2, a mecha-shutter 3, and a diaphragm 4 which are set along the optical axis.

In the CCD 5, signal charge accumulated in a photoelectric conversion area (photosensitive area) formed by a photodiode array for forming a photoelectric conversion pixel is transferred from the photoelectric conversion area to a vertical transfer area by a CCD readout pulse. In addition, through application of a vertical transfer signal and a horizontal transfer signal, a signal charge in the vertical transfer area is vertically transferred, and concurrently, a sequential signal charge is output from an output terminal of the horizontal transfer area.

To the CCD 5 is applied a CCD drive signal (such as a CCD readout pulse and a transfer signal composed of a horizontal signal and a vertical signal) from a timing generator circuit (hereinafter referred to as a "TG circuit") 6; thereby an image-capture signal (or an image signal) is output from the CCD 5, and then the image-capture signal is sample-held by a sample/hold circuit 7 in the unit of a pixel so that only a signal component is extracted.

Furthermore, the extracted signal component is then gain-conditioned in a gain control circuit (hereinafter referred to as a "GC circuit") 8 and is input to an A/D converter 9 so as to be converted from the analog signal to a digital signal. The sample/hold circuit 7 and the A/D converter 9 then receive a timing signal from the TG circuit 6 to perform sample-holding and A/D conversion with a predetermined timing.

The digital signal that is output from the A/D converter 9 is then input to a signal conditioning circuit 10, therein signal-conditioned and converted to an image signal, and input to a record system 11 comprising a record medium such as a memory card and to a liquid crystal display device (hereinafter referred to as an "LCD") 12, which displays images.

The LCD 12 then displays the subject image. At this stage, when a release switch (not shown) is operated, a shutter trigger which is to record image subjects is actuated to record the subject image in the record medium.

The aforementioned digital signal is input to an integration circuit 13 that generates a signal of an AE integration value which integrates the digital signal in an exposure-sensing area to perform automatic exposure. (referred to as "AE") corresponding to the brightness of the image of the subject. The generated signal is output to an exposure operation/control circuit 14. This exposure operation/control circuit 14 comprises a function for controlling the aperture (exposure amount) of the diaphragm 4, open/close operations of the mecha-shutter 3, and CCD-shuttering by means of the CCD 5, synchronously with the timing signal from the TG circuit 6, so that the image is recorded in the record system 11 in an appropriate condition in regard to the brightness and the exposure amount.

This exposure operation/control circuit 14 also comprises another function for controlling integrating operations for the gain of the GC circuit 8 and in integration circuit 13.

This first embodiment is characterized in that the exposure operation/control circuit 14 performs an ON/OFF control through the TG circuit 6 so that an AE integration value containing almost no smear component is produced through operations with CCD outputs in ON and OFF states, whereby an image is recorded in exposure conditions with no smear effect in actual exposure and image-recording.

In particular, in a first drive period a common CCD drive method is used to expose the photoelectric conversion area, to transfer the signal charge to the vertical transfer area by a CCD readout pulse, and then to apply a transfer signal for producing an output from the CCD 5; alternately repeated after the first drive period is a second drive period, in which a drive method is used without application of the CCD readout pulse (i.e. the CCD readout pulse is OFF) but instead a transfer signal is applied to extract only smear components through the CCD 5 from a signal in the vertical transfer area; thereby an AE integration value containing almost no smear component is calculated by using the AE integration value to record an image in the exposure condition with no smear effect in actual exposure and image-recording.

Referring to a timing chart of FIG. 2, a description will be given of an operation of this embodiment.

Figure 5:
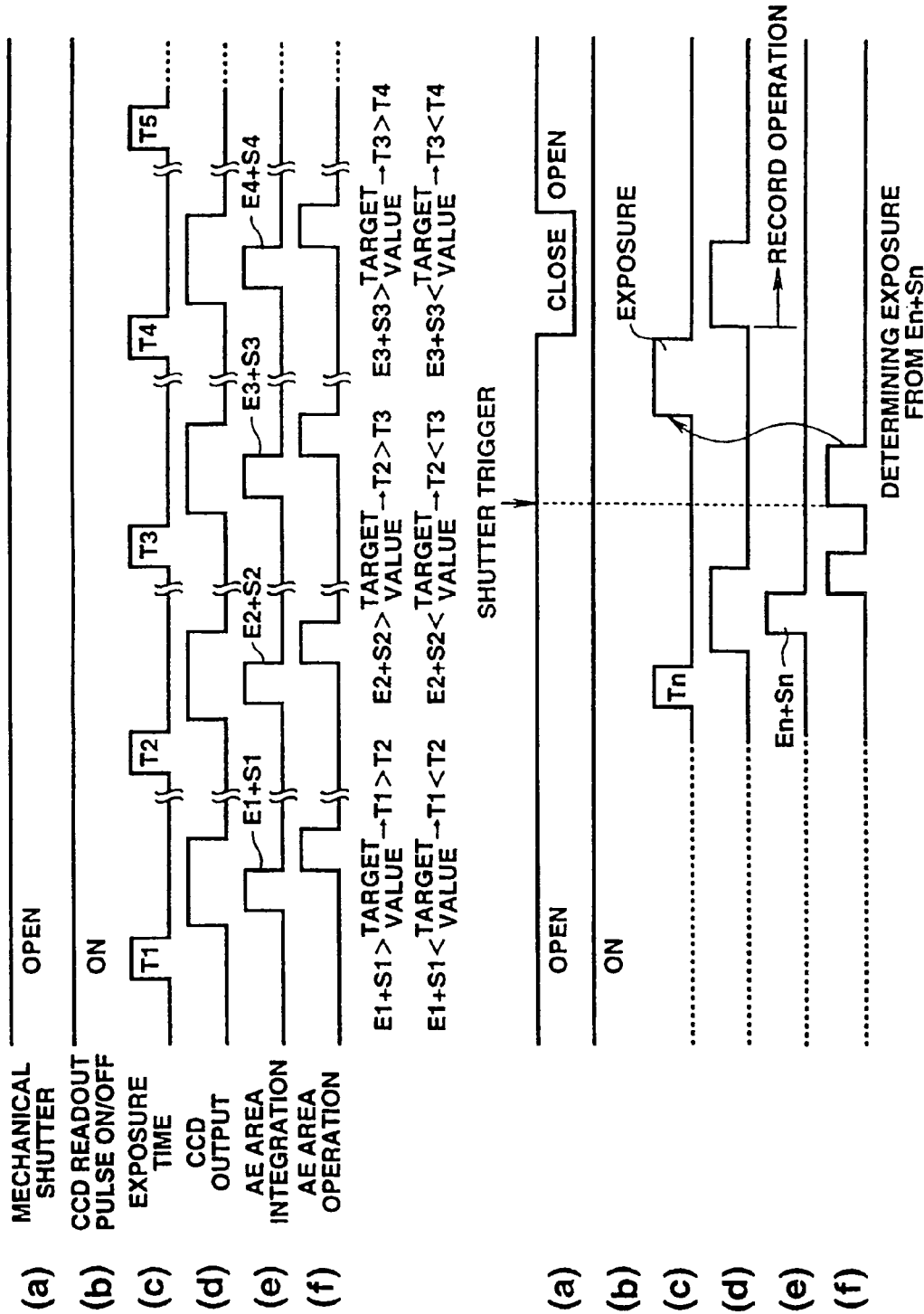
FIG. 5 is a timing chart illustrative of operation of a conventional example.

In this timing chart of FIG. 2, in the same way as the timing chart of FIG. 5 for a conventional example, each of the horizontal axes represents time and is separated into two sections because of limited space, the right end of the axis in the upper section continuing to the left end of the axis that has the same alphabetical letter (i) (i=a, b, . . . , f) in the respective lower section. Other figures such as FIG. 2 are displayed in the same way.

In FIGS. 2,(*a*)–(*f*) respectively represent a mechanical shutter, CCD readout pulse ON/OFF, exposure time, CCD output, AE area integration, and AE operation.

The mechanical shutter (mecha-shutter) shown in FIG. 2(*a*) is kept OPEN until it receives a shutter trigger, and it changes to the CLOSE state upon receipt of a shutter trigger.

As shown in FIG. 2-(*b*), the CCD readout pulse transferring from the photosensitive area (photoelectric conversion area) of the CCD 5 to the transfer area is switched from an ON state to an OFF state after a signal charge exposed by a common drive method at the exposure time TI (I=1, 2, . . . , n) shown in FIG. 2-(*c*) has been output; and in this OFF state, a signal in the horizontal transfer area is output from the CCD 5 by a transfer signal.

In particular, in the image-capture period corresponding to one image plane, after the exposure time TI, a signal charge of the photoelectric conversion area is transferred by a CCD readout pulse to the vertical transfer area of the photosensitive conversion area, and, through application of a transfer signal, the transferred signal charge in the vertical transfer area is serially output from the CCD 5. This output is indicated as the (d) item of CCD output in FIG. 2.

The CCD output is input not only to the signal conditioning circuit 10 but also to the integration circuit 13 through the S/H circuit 7, the GC circuit 8, and A/D converter 9. This integration circuit 13 is controlled by the exposure operation/control circuit 14 to perform integrating operations during the time when the CCD output in the AE area is being input, and after having performed an integrating operation in the AE area, it then outputs the AE area integration value EI+SI shown in FIG. 2-(*e*) to the exposure operation/control circuit 14.

In this value, EI represents a net integration value of the signal charge accumulated in the photoelectric conversion area (AE sensing area) at the exposure time TI; SI represents an integration value of a so-called smear occurring in the vertical transfer area because of oblique incidence transmission of a bright subject image and the like.

Consecutive to the above, the CCD readout pulse is turned to OFF and null signal charge is output from the CCD 5 through application of a transfer signal (in the same way as for the signal charge which is not null). In this case, since exposure time is not applied, it is virtually indicated by X and a dot line in FIG. 2-(*c*).

For this CCD output as well, the integration circuit 13 performs the integrating operation with the timing where the CCD output is being input from the AE area and then outputs the AE area integration value SI' to the exposure operation/control circuit 14.

This AE area integration value SI' is almost the same as the AE area integration value SI produced with the previous timing, except when an image subject is suddenly moved (against the camera 1). The value in this case is therefore SI≈SI', which shows the two are nearly the same.

The exposure operation/control circuit 14 performs the AE operation from the two AE area integration values EI+SI and SI'. In particular, this circuit performs the operation to determine whether the operation EI+SI−SI' is larger than the target value; if EI+SI−SI'>target value, the circuit then sets TI>TI+1 to the next exposure time TI+1; if EI+SI−SI'<target value, the circuit then sets TI<TI+1 to the next exposure time TI+1.

This circuit also conditions the diaphragm 4 and a gain of the GC circuit 8. When the circuit conditions these, it sets factors in consideration of the conditioning effects to the exposure time TI+1.

The operation value EI+SI−SI' thus produced in each of the image-capture periods results in the value EI containing almost no smear component.

For reference, when the AE area integration value EI+SI or SI' is received, the aperture of the diaphragm 4 and the gain of the GC circuit 8 are maintained at the same value.

These operations are repeated in series for each of the image-capture periods. However, when the release switch is operated and an actual shutter trigger for image-recording is received, the exposure operation/control circuit 14 determines an actual exposure condition based on the last AE operation value En+Sn−Sn'≈(−En), controls the TG circuit 6 to operate at the actual exposure time in the actual condition, and then sets the aperture of the diaphragm 4.

Consecutive to the above, the signal charge accumulated in the photoelectric conversion area during the actual exposure time is transferred to the vertical transfer area by the CCD readout pulse which has been turned to ON, and concurrently, the mechanical shutter 3 is shut off. In the state where the mechanical shutter 3 is kept closed, the signal charge transferred to the vertical transfer area is vertically transferred by the transfer signal and the signal charge which has been transferred to the horizontal transfer area is serially output from an output terminal thereof, is signal-conditioned in the signal conditioning circuit 10, is compressed by an image compression circuit (such as a JPEG circuit) of the record system 11, and is stored in a record medium, such as a memory card and the like.

The mechanical shutter 3 is at least kept closed during the CCD output period (specifically, the vertical transfer period); thereafter, it opens.

Upon completion of the record operation in the record system 11, it becomes ready to start a subsequent still-image capturing operation.

According to the embodiment in which the operations are performed as described above, because an AE operation value containing almost no smear component can be produced, when an image is actually recorded and even after the mechanical shutter 3 is closed, smear-induced deviations in the exposure amount from a proper exposure amount can be almost completely prevented. Consequently, even in a bright image subject scene, image record operations can be performed in a proper exposure condition containing almost no smear effect.

Next, a description will be given of a second embodiment of the present invention with reference to a timing chart of FIG. 3. This embodiment is relevant to FIG. 1 in construction, but is different in the operation.

Particularly, this embodiment performs the operation in almost the same manner as the conventional example such as that shown in FIG. 5 until it receives a shutter trigger. Upon receipt of a shutter trigger, however, in this embodiment a CCD readout pulse is set to an OFF state and begins to read null signal charge in a vertical transfer area (i.e. so-called smear-component extraction), and after performing an AE operation containing almost no smear component as in the first embodiment, it determines an actual exposure condition to perform the image-recording.

Figure 3:
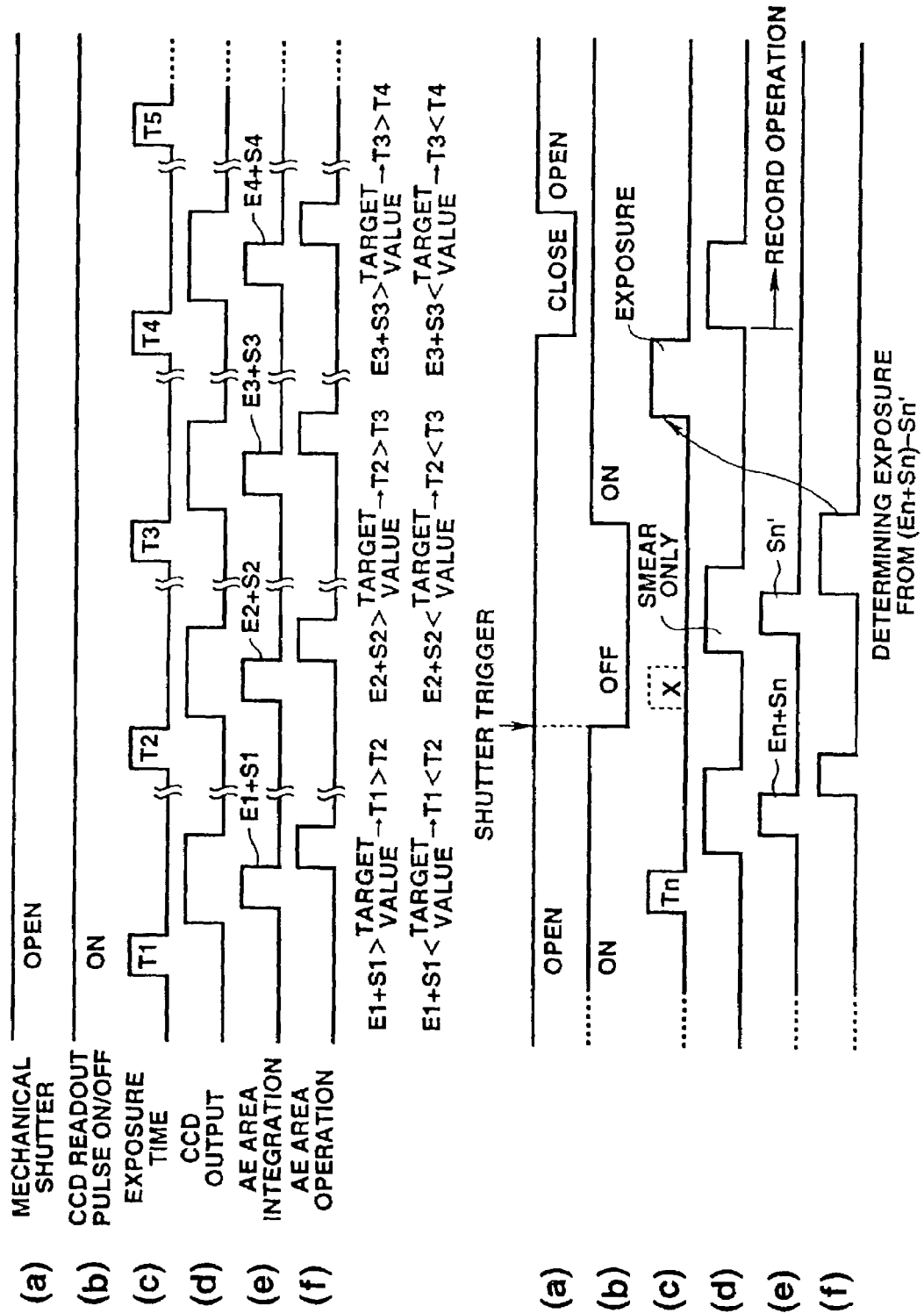
FIG. 3 is a timing chart for a description of operation of a second embodiment of the present invention.

The timing chart of FIG. 3 is illustrative of the same performance as the conventional example during the time before a shutter trigger is received. In this performance, the CCD readout pulse is kept in an ON state until a shutter trigger is received, a signal charge in the photoelectric conversion area of the CCD 5 is transferred to the vertical transfer area after the exposure time TI, and then the signal charge transferred in the vertical transfer area has vertical and horizontal transfer signals applied thereto, and thus a CCD output is produced.

A signal corresponding to the AE sensing area in this CCD output step is subjected to an integrating operation in the integration circuit 13 and the integration value EI+SI is input to the exposure operation/control circuit 14.

The exposure operation/control circuit 14 then performs an AE operation for automatic exposure and a comparison operation to compare the integration value EI+SI to a target value. If the EI+SI>target value, the circuit 14 determines the next exposure time TI+1 so as to be TI>TI+1; while, if the EI+SI<target value, it determines the next exposure time TI+1 so as to be TI<TI+1.

In this way, when the next exposure time TI+1 is consecutively determined and a release operation is performed after the exposure time Tn, this embodiment is then arranged to operate similar to the first embodiment.

Upon receipt of a shutter trigger, a CCD output that contained the smear component during the last exposure time Tn is output, the CCD readout pulse is set to be in an OFF state, and then null signal charge in the vertical transfer area is transferred to be output from the CCD 5; after all, only the smear component is output.

The exposure operation/control circuit 14 uses the CCD output of the integration circuit 13, which contained the smear component during the aforementioned exposure time Tn, to receive an integration value Sn' containing only the smear component in the same case as the integration value En+Sn.

The exposure operation/control circuit 14 then receives an AE operation value En+Sn−Sn' from the integration values En+Sn and Sn', based on which it determines an actual exposure condition.

In actual image-recording with this embodiment, the target value or a reference exposure condition is determined from the last AE operation value En+Sn−Sn', i.e. the AE operation value En containing almost no smear component, so that an appropriate exposure condition is determined.

Accordingly, this allows actual image-recording in appropriate conditions despite that when a shutter trigger is not received, the exposure condition includes an AE area integration value which is larger to correspond to the smear component, causing the CCD output darker.

According to this embodiment, control-related operations performed in the first embodiment can be eliminated because the null-readout for extracting the smear component is not necessary until a shutter trigger is received.

In addition, in the first embodiment, an image cannot be produced during any of the periods in which the null-readout for the smear-component extraction is performed, causing the LCD 12 to display images only in the periods in which the images can actually be produced. In this second embodiment, however, only one effect such as that described above occurs when the shutter trigger is received, allowing the display of smoothly-moving images on the LCD 12.

Next, a description will be given of a third embodiment of the present invention with reference to a timing chart of FIG. 4. This embodiment is relevant to FIG. 1 in construction in which the CCD readout pulse ON/OFF is always set to be in an ON state, but is different in the operation.

Before receiving a shutter trigger, in this embodiment is performed exposure at two different times and an AE operation value containing almost no smear component is received from the CCD outputs; and when a shutter trigger is received, in this embodiment, exposure conditions are determined from an AE operation value containing almost no smear component; thereby allowing image-recording with almost no smear effect and with an appropriate brightness. In this embodiment, as shown in FIG. 4-(c) for example, an image is captured practically at each of the double exposure time 2TI and single exposure time TI and, after each time has elapsed, an image is output from the CCD 5 in the common CCD drive method.

Figure 4:
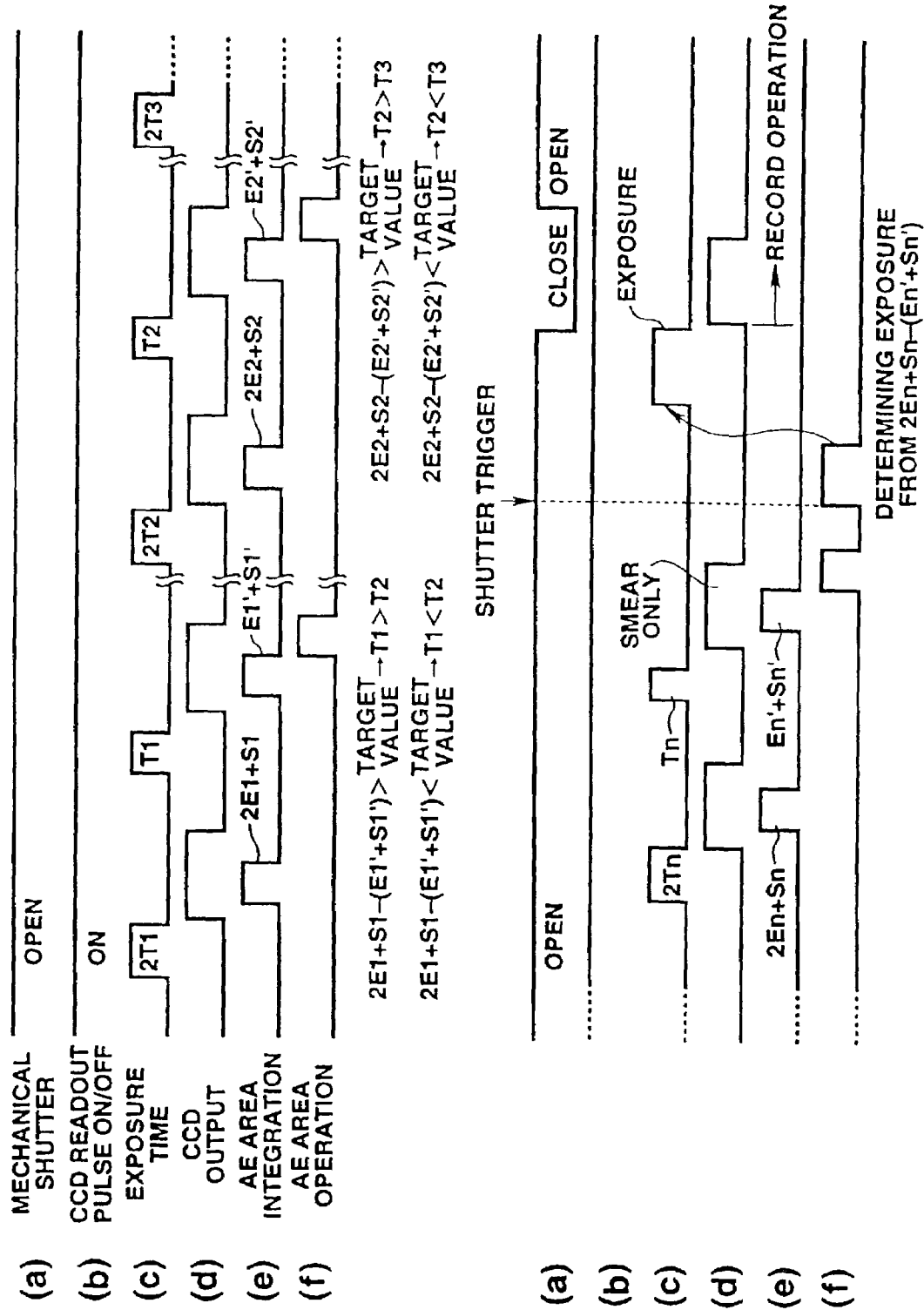
FIG. 4 is a timing chart for a description of operation of a third embodiment of the present invention.

Then, as shown in FIG. 4-(e), the integration circuit 13 receives the integration values 2EI+SI and EI'+SI' in the AE area with each of the CCD outputs to output the image to the exposure operation/control circuit 14.

This exposure operation/control circuit 14 uses the integration values 2EI+SI and EI'+SI' to compare the AE operation value 2EI+SI−(EI'+SI') to a target value. If 2EI+SI−(EI'+SI')>target value, the circuit 14 then determines the next exposure time TI+1 so as to be TI>TI+1; and conversely, if 2EI+SI−(EI'+SI')<target value, it then determines the next exposure time TI+1 so as to be TI<TI+1.

In this case, the smear amount depends upon the substrate-surface illuminance and the transfer time in the CCD 5; however, since it does not depend upon the exposure time, it is possible to assume it as EI≈EI' and SI≈SI'.

For this reason, the AE operation value 2EI+SI−(EI'+SI') is allowed to receive a value EI containing almost no smear component, and based on this value, the next exposure time and the like are determined.

Also, in the same way as the first embodiment, upon receipt of a shutter trigger, the AE operation value 2En+Sn−(En'+Sn') (≈AE operation value En) received in the last image-capture period is used for determination of the actual exposure conditions.

In this embodiment can be performed is image-recording in appropriate exposure conditions without receiving a smear-component effect from the CCD output produced when an image is captured at two different exposure times, one being a single exposure time and the other being a double exposure time.

For reference, a single exposure time and a double exposure time are set in this embodiment; however, the setting of the exposure times is not limited thereto. For example, the exposure time may be set at 1.5 times as much and the value 0.5 EI that can be approximately obtained from an AE operation may be set at twice as much to determine the next exposure time and the like. In other words, one exposure time TI may be set so as to be at least a different exposure time from another exposure time.

A variation example of this is an arrangement in which the next exposure time and the like may be determined by setting the two exposure times in each of the image-capture periods to the same exposure time, changing the horizontal transfer time to receive a smear-component evaluation value, subtracting the evaluation value from an AE operation value containing the smear component to receive an AE operation value containing almost no smear component, and using the AE operation value thus produced.

According to the present invention such as described above, in an automatic exposure control apparatus receiving an exposure evaluation value from an output signal of a solid-state imaging device and using the evaluation value as a reference value to perform automatic exposure control for the solid-state imaging device, because an exposure evaluation value containing almost no smear component from two output signals received through application of the same drive signal from the solid-state imaging device as was image-captured in a first exposure time and in an exposure time which is practically twice that of the first exposure time is received, exposure errors resulting from the smear component can be eliminated almost completely and appropriate exposure can be automatically obtained even in bright scenes in which smears can occur.

What is claimed is:

1. An automatic exposure control apparatus receiving an exposure evaluation value from an output signal of a solid-state imaging device and using the evaluation value as a reference value to perform automatic exposure control for the solid-state imaging device, characterized by comprising an arrangement configured for receiving an exposure evaluation value containing almost no smear component based on obtaining a difference between first and second signals respectively received through application of the same drive signal from the solid-state imaging device that has been image-captured in a first exposure time and in a second exposure time which is practically twice that of said first exposure time.

2. The apparatus of claim 1 wherein the second exposure time is two times a normal exposure time.

3. The apparatus of claim 1 wherein smear components obtained in the first and second exposure times are substantially equal.

4. The apparatus of claim 1 wherein the first signal has a first charge component and the second signal has a second charge component having a value which is twice that of the first charge component.

5. The apparatus of claim 1 wherein said arrangement directly subtracts one of said first and second signals from the other one of said first and second signals.

6. The apparatus of claim 1 further comprising a unit for comparing, during each exposure period, the exposure evaluation value with a threshold value and increasing the exposure period, for use during a next exposure period, if the exposure evaluation value is less than said threshold value.

7. The apparatus of claim 1 further comprising a unit for comparing, during each exposure period, the exposure evaluation value with a threshold value and reducing the exposure period, for use during a next exposure period, if the exposure evaluation value is greater than said threshold value.

8. The apparatus of claim 1 wherein said arrangement obtains the exposure evaluation value by being configured to directly subtract one of the first and second signals from the other.

9. An automatic exposure control apparatus receiving an exposure evaluation value from an output signal of a solid-state imaging device and using the evaluation value as a reference value to perform automatic exposure control for the solid-state imaging device, characterized by comprising an arrangement configured for generating an exposure evaluation value containing almost no smear component based on a obtaining difference between first and second output signals received through application of the same drive signal from the solid-state imaging device that has been image-captured in a first exposure time and in an exposure time which is different from said first exposure time.

10. The apparatus of claim 9 wherein the second exposure time is one-and-one half times a normal exposure time.

11. The apparatus of claim 9 wherein the first and second signals have smear components which are substantially equal.

12. The apparatus of claim 9 further comprising a device for combining the first and second signals to remove the smear components.

13. The apparatus of claim 9 further comprising a unit for comparing, during each exposure period, the exposure evaluation value with a threshold value and increasing the exposure period, for use during a next exposure period, if the exposure evaluation value is less than said threshold value.

14. The apparatus of claim 9 further comprising a unit for comparing, during each exposure period, the exposure evaluation value with a threshold value and reducing the exposure time, for use during a next exposure period, if the exposure evaluation value is greater than said threshold value.

15. The apparatus of claim 9 wherein said arrangement obtains the exposure evaluation value by being configured to directly subtract one of the first and second signals from the other.

16. A method for operating a photoelectric conversion device to obtain an exposure evaluation value, comprising:
   a) reading out from the conversion device, during a first interval of an exposure period, a first integrated exposure value and a smear value;
   b) reading out from the conversion device, during a second interval of said exposure period, a second integrated exposure value and a smear value, said first and second time intervals being different; and
   c) employing the values obtained during steps (a) and (b) to obtain said exposure evaluation value.

17. The method of claim 16 wherein one of said first and second intervals is twice as great as the other one of said first and second time intervals.

18. The method of claim 16 further comprising:
   during each exposure period, comparing the exposure evaluation value with a threshold value; and
   increasing the exposure period, for use during a next exposure period, when the exposure evaluation value is less than the threshold value.

19. The method of claim 16 further comprising:
   during each exposure period, comparing the exposure evaluation value with a threshold value; and
   reducing the exposure period, for use during a next exposure period, when the exposure evaluation value is less than the threshold value.

20. The method of claim 16 wherein step (c) further comprises subtracting the value obtained in one of the steps (a) and (b) from the value obtained in the other of the steps and (a) and (b).

21. An automatic exposure control apparatus receiving an exposure evaluation value from an output signal of a photoelectric conversion area performing photoelectric conversion and an output signal of a solid-state imaging device comprising a transfer area wherein the signal is transferred from the photoelectric conversion area and using the evaluation value as a reference value to perform automatic exposure control for the solid-state imaging device, characterized by comprising a first drive unit for transferring a first exposure signal and a smear signal in said photoelectric conversion area during a first interval in each exposure period to a transfer area and then outputting the first exposure signal and smear signal from said solid-state imaging device; and a second drive unit for outputting a second exposure signal and a smear signal in said photoelectric conversion area during a second interval of each exposure period from solid-state imaging device, the first and second intervals being different; wherein is obtained an exposure evaluation value containing almost no smear component based upon the a difference between two output signals received from said first drive unit and said second drive unit.

22. The apparatus of claim 21 wherein one of said first and second signals is twice as great as the other one of said first and second signals.

23. The apparatus of claim 21 wherein the difference is obtained by subtracting one of the output signals of the first and second drive units from the other.

\* \* \* \* \*

UNITED STATES PATENT AND TRADEMARK OFFICE
CERTIFICATE OF CORRECTION

PATENT NO. : 7,167,204 B2  Page 1 of 1
APPLICATION NO. : 10/205433
DATED : January 23, 2007
INVENTOR(S) : Kidono et al.

It is certified that error appears in the above-identified patent and that said Letters Patent is hereby corrected as shown below:

IN THE SPECIFICATION

At column 2, line 25, after the word "present", delete "existed".

At column 8, line 57, after the word "performed", delete "is" and insert therefor --an--.

IN THE CLAIMS

At claim 9, column 10, line 12, after the words "based on", delete "a" and insert therefor --an--.

At claim 21, column 12, line 7, after the word "upon", delete the word "the".

Signed and Sealed this

Third Day of February, 2009

JOHN DOLL
*Acting Director of the United States Patent and Trademark Office*